United States Patent [19]

Worley

[11] 4,261,385

[45] Apr. 14, 1981

[54] CYLINDER VALVE

[75] Inventor: Arthur C. Worley, Mt. Tabor, N.J.

[73] Assignee: Exxon Research and Engineering Co., Florham Park, N.J.

[21] Appl. No.: 58,005

[22] Filed: Jul. 16, 1979

[51] Int. Cl.³ .................. F16K 49/00; F16K 3/26
[52] U.S. Cl. ............................ 137/340; 137/375
[58] Field of Search ............................ 137/340, 375

[56] References Cited

U.S. PATENT DOCUMENTS

| | | |
|---|---|---|
| 1,827,266 | 10/1931 | Shipley . |
| 3,213,876 | 10/1965 | Manton ............................ 137/340 |
| 3,448,761 | 6/1969 | Feinman ........................... 137/375 |
| 3,574,341 | 4/1971 | Fehling et al. . |
| 3,698,422 | 10/1972 | Freed et al. . |
| 3,701,359 | 10/1972 | Worley et al. . |
| 3,726,306 | 4/1973 | Purvis ............................. 137/375 |
| 3,825,030 | 7/1974 | Kalsi . |
| 3,901,269 | 8/1975 | Henderson . |
| 3,974,869 | 8/1976 | Abe et al. . |
| 3,985,150 | 10/1976 | Kindersley . |

FOREIGN PATENT DOCUMENTS 567039 12/1932 Fed. Rep. of Germany ........... 137/375

Primary Examiner—Gerald A. Michalsky
Attorney, Agent, or Firm—R. D. Paris; R. S. Salzman

[57] ABSTRACT

A cylinder valve comprising a hollow cylinder having a cross-passage, for use as a valve element, preferably in high temperature fluid solid service, to block flow. The cylinder is enclosed in a refractory lined steel body which includes a main flow passage. The valve cylinder can be rotated 90° about its longitudinal axis to either fully open or fully close the flow passage in the extreme cases. It can also function in an intermediate position as a throttling member. Water or other coolant flow may be provided and maintained through the cylinder if hollow, or the cylinder can be solid for small size valves. The refractory in the main flow passage surrounding the cylinder serves the dual purpose of valve seat and as insulation against extreme temperatures.

2 Claims, 6 Drawing Figures

CYLINDER VALVE

BACKGROUND OF THE INVENTION AND PRIOR ART

Heretofore, ball-type valves have been employed in high temperature, medium high pressure processes for isolating blocking solids flow. However, various operational difficulties are associated with such valves including seating of the ball due to differential or thermal expansion differences between the ball and the valve seats. Solids plugging problems due to the restricted throat of the valves had been experienced and is due to change in flow direction through the flow passage of the valves. While the concept of employing water coolant or steam heating by jacketing of the valve body for plug, gate and butterfly valves has been employed for various valves, none of these prior art valves, however, have provided a simple-to-manufacture, economical valve which has special suitability for high temperature fluid solids service.

The various prior art references located relative to the present invention include U.S. Pat. Nos. 1,827,266 (Shipley), 3,574,341 (Fehling), 3,698,422 (Freed et al), 3,701,359 (Worley et al), 3,825,030 (Kalsi), 3,901,269 (Henderson), 3,973,585 (Henderson), 3,974,869 (Abe et al), and 3,985,150 (Kindersley).

Worley et al discloses an internally insulated slide valve for throttling and blocking solids flow at high temperatures and high pressures in a fluid solids transfer line. The Henderson patents disclose a jacket block with a hollow housing of heat conductive material (see FIG. 3) which substantially surrounds the body of the fitting (see FIG. 1). A temperature controlling fluid is circulated through chambers in heat transfer relation to the body of the fitting. The Freed et al patent discloses a plug valve for controlling fluid flow therethrough by rotating the plug valve until a port is aligned with lateral passages. These lateral passages are lined with a corrosion resistant liner. Kalsi discloses a plastic-lined valve with a rotatable central fluid conduit for controlling communication between passages. The plastic lining is injection molded into locking engagement with the valve body. Kindersley discloses a ball valve having a changeable tubular insert (made of abrasion-resistant material) situated in the valve for controlling the rates of flow between inlet and outlet bores. Fluid flow throttling also can be accomplished by turning the valve a limited amount. Fehling discloses refractory lining the valve closure which regulates flow of molten metal, while Shipley discloses a metal lining for cooperation with a valve plug. Abe discloses a plug valve supported and sealed in an elastic plastic bearing member which takes up wear and prevents leakage.

SUMMARY OF THE INVENTION

The present invention relates to valves and more particularly to an improved cylinder valve particularly for fluid solids service.

According to the present invention, there is disclosed a cylinder valve comprising a hollow refractory lined steel cylinder or pipe body which is bisected by a hollow or solid cylinder of relatively smaller diameter for defining a fluid flow cross passage when aligned with the adjacent main flow passage. A pair of stems extend along the longitudinal axis of the hollow or solid cylinder for enabling turning movement of the cylinder inside the valve body to open or close the main flow path fully or partially, and also to facilitate entry and exit of a cooling medium for the hollow cylinder if cooling is desired. For erosive or high temperature application the flow path through the hollow cylinder can be lined with refractory to reduce the need for cooling.

The present valve is simple to manufacture and essentially can be fabricated from standard pipe fittings and parts.

DESCRIPTION OF THE PREFERRED EMBODIMENT

Figure 1:
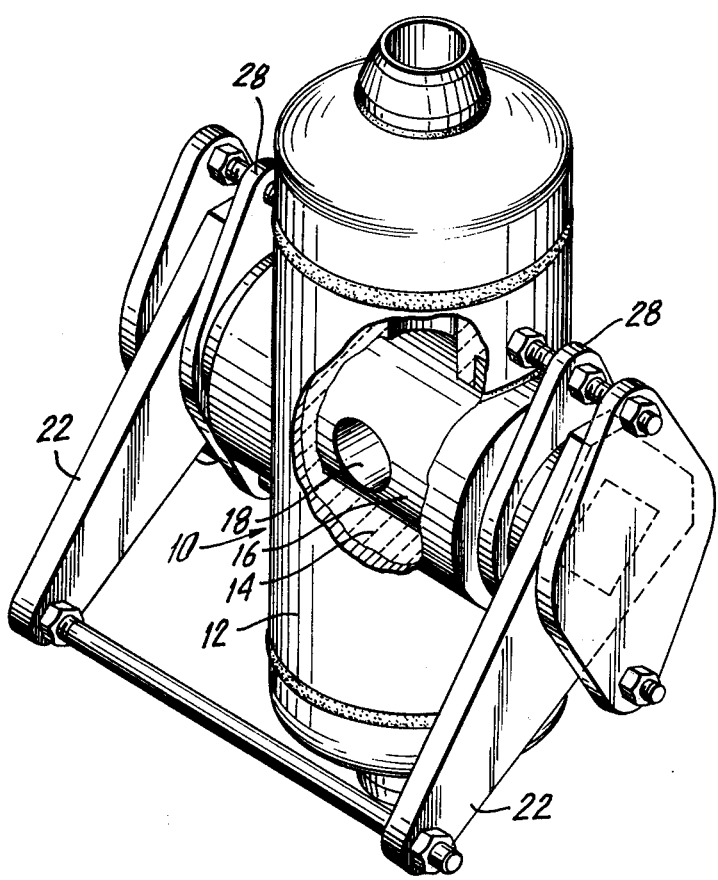
FIG. 1 is a perspective view of a valve according to an embodiment of the present invention, in its closed position installed in a steel cylinder.
Figure 2:
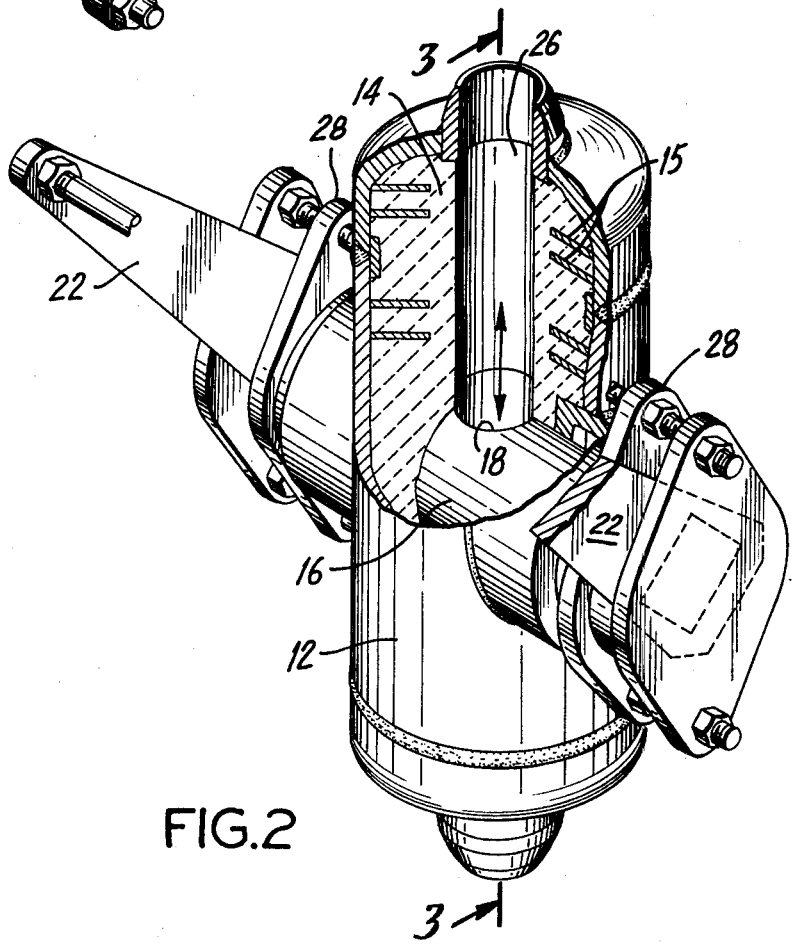
FIG. 2 is a perspective view of a valve like that of FIG. 1, showing the valve turned into its fully open position.
Figure 3:
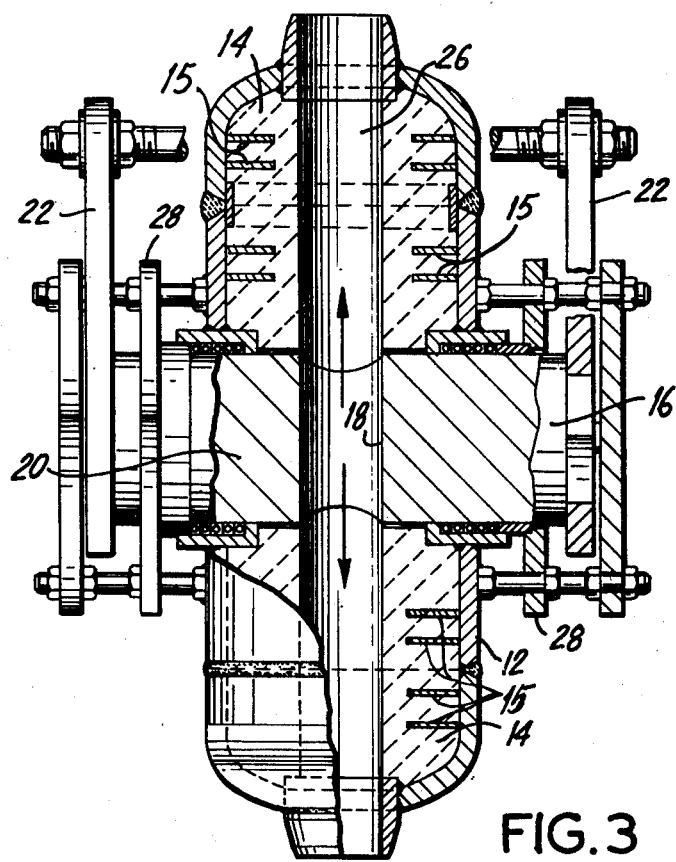
FIG. 3 is a cross-sectional view taken substantially along the line 3—3 of FIG. 2.
Figure 4:
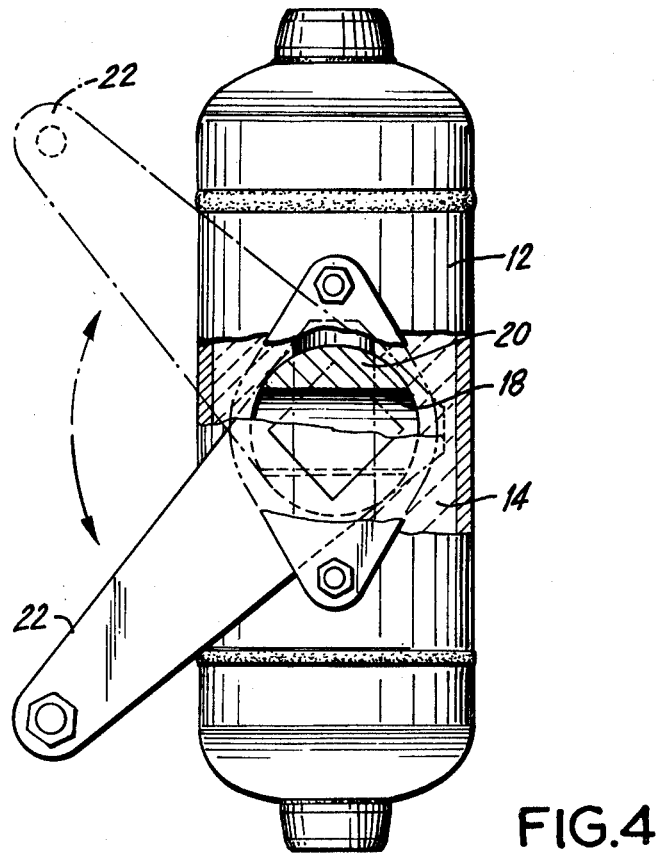
FIG. 4 is a side elevational view of the valve according to the present invention.
Figure 5:
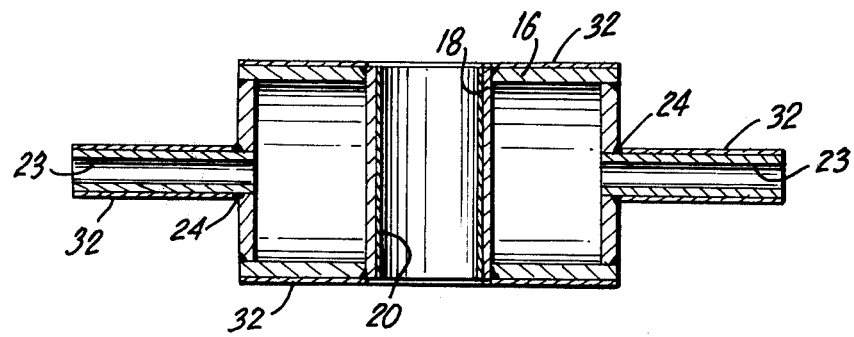
FIG. 5 is another embodiment of this invention showing a hollow cylinder which is an internal component within a body (not shown).
Figure 6:
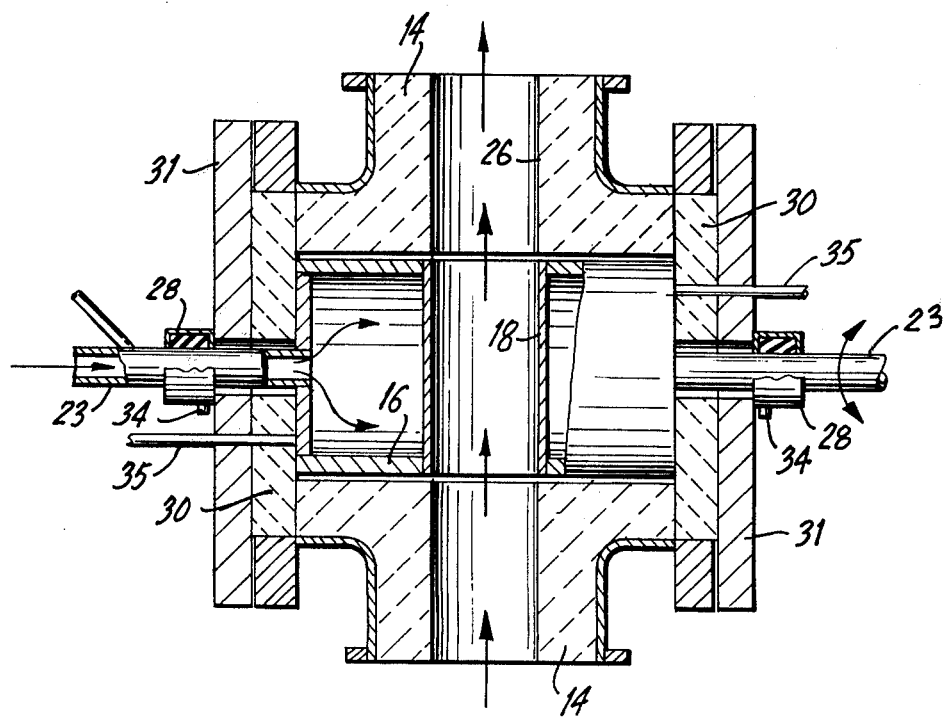
FIG. 6 is a cross-sectional view of the hollow cylinder in FIG. 5 located within a refractory lined body.

Referring now to the drawings wherein throughout the several views like parts are designated by the same reference numeral, there is shown in FIG. 1 a valve cylinder 16 enclosed in a steel body 12 lined with wire reinforced refractory 14. The assembly is designated 10. The refractory also typically would include a series of vapor stops to prevent gas bypassing between the refractory and the body. The valve cylinder 16 is bisected by a smaller diameter cylinder 18 comprising the flow cross path. The body 12 is filled with refractory 14 which serves as a support and seat for 18 and 16 surrounds the vapor path cylinder, for erosion and/or thermal protection of the body 12. At opposite axial ends the hollow or solid cylinder 16 is conventionally coupled with lever means 22 for turning the cylinder 16 from a fully closed position to a fully open position by a rotation of lever 22 of 90 degrees. The lever can be coupled to an operator for automatic turning (e.g., hydraulic, electric). Stems 23 (see FIGS. 5 and 6) aligned with the longitudinal axis of the hollow cylinder 16 are provided for use in turning the cylinder and can also be provided for entry and exit of a cooling medium through the cylinder. This would be accomplished by the valve design as shown in FIGS. 5 and 6. The stems are welded to the cylinder as shown at 24. The refractory 14 in the steel piping defines a central main body flow passages 26. The flow cross path 18 in the hollow cylinder 16 can be refractory lined as shown at 20 (FIG. 5) in order to reduce the cooling effect on the fluid solids flow therethrough. The valve components according to the present invention is made from a combination of materials such as austenitic stainless steel for high temperature internals and carbon steel for the external parts such as body and levers. The cylinder is symmetrically constructed about its longitudinal turning axis for ease and balance in turning. The hollow or solid cylinder is concentrically disposed within the steel pipe body 12 having its stems or the cylinder passing through standard stuffing glands 28, which prevent leakage at the stems 23. A flanged end 31 can be provided on the body assembly 10 by welding to the body to make it possible for removal of the cylinder 16 from the main flow passage. At opposite ends of the hollow or solid cylinder between the cylinder and steel pipe is a standard packing collar generally designated 28 for assisting in maintaining the valve in its proper position and facilitating turning without leakage.

The internal refractory lining inside 10 is formed by casting the refractory mixture into the annulus which is formed between the cylinder 16 and the steel body 12 with the cylinder 16 in place. The refractory when cast will comprise the exact form of the concentrically positioned internal hollow or solid cylinder 16. This permits close tolerances to be maintained between the refractory lining and the internal alloy. By wrapping the valve cylinder in foil or tape during the refractory casting process the refractory is prevented from binding to the cylinder 16 surface for easy disassembly. The clearance between the cylinder 16 and the refractory can be controlled by varying the thickness of the wrapping to allow for thermal expansion of cylinder 16. During the refractory casting process, the cross path 18 in the hollow cylinder is blocked by use of a suitable cylindrical form. The alloy fiber reinforcement in the refractory will hold it together to maintain the desired dimensions and minimize any shrinkage cracking. Good erosion resistance to solids flow conditions is present in view of the fact the lining comprises an all-refractory construction.

The stems 23 mentioned heretofore and shown in FIGS. 5 and 6 have a dual function. In addition to providing a means for enabling turning of the cylinder between its closed and open positions, water or other cooling medium can flow through the stems into the hollow cylinder. The flow path is through the stems and the cooling flow passes about the cross cylinder 18. This coolant will permit construction of valve internals for use for high temperature service. Refractory shown at 30 also can be provided at opposed axial flanged ends for thermal insulation of the flanged 31 components provided with stuffing glands 28.

Although the preferred embodiment of the invention has the valve operating in either fully closed or fully open position, partial opening for throttling purposes is also possible by providing suitable hard surfacing 32, on the outer cylinder 16 surface as shown in FIG. 5, as well as in the cross path 18.

A purge connection 34 can be provided at the base of stuffing gland 28 to prevent fluid solids from entering the stuffing gland 28. A similar purge 35 can be added to prevent fluid solids from entering the annulus or space between 16 and the refractory lining 14 and 30 in body assembly 10.

What is claimed is:

1. A cylinder valve for use with high temperature fluid solids and cooperating with a main flow passage, defined by a hollow refractory material having a steel liner, said refractory material serving as a seat for a cylinder, said cylinder having a transverse axis extending across said flow passageway and rotatable about said transverse axis, a cross passage comprising a cylindrical opening through said cylinder with its centerline perpendicular to said cylinder axis for alignment of the cylindrical cross opening with said main flow passage when said cylinder is rotated about its axis into a fully open position with respect to said main flow passage, said cylinder being hollow on the inside and having a hard-surfaced outer surface, hollow stems aligned with, and welded to, said cylinder for both rotating said cylinder about its axis and for providing a path for flow of liquid coolant about said cross cylinder passage, and a stuffing gland disposed about each stem for preventing leakage of said fluid solids.

2. The valve of claim 1, wherein each of said stuffing glands has a purge connection for preventing fluid solids from entering the stuffing gland.

* * * * *